3,144,507
SPLINT TYPE REINFORCED CONDUCTOR JOINT
Marvin D. Scadron, Skokie, Ill., assignor to American
Radiator & Standard Sanitary Corporation, New York,
N.Y., a corporation of Delaware
Filed May 4, 1962, Ser. No. 192,449
3 Claims. (Cl. 174—84)

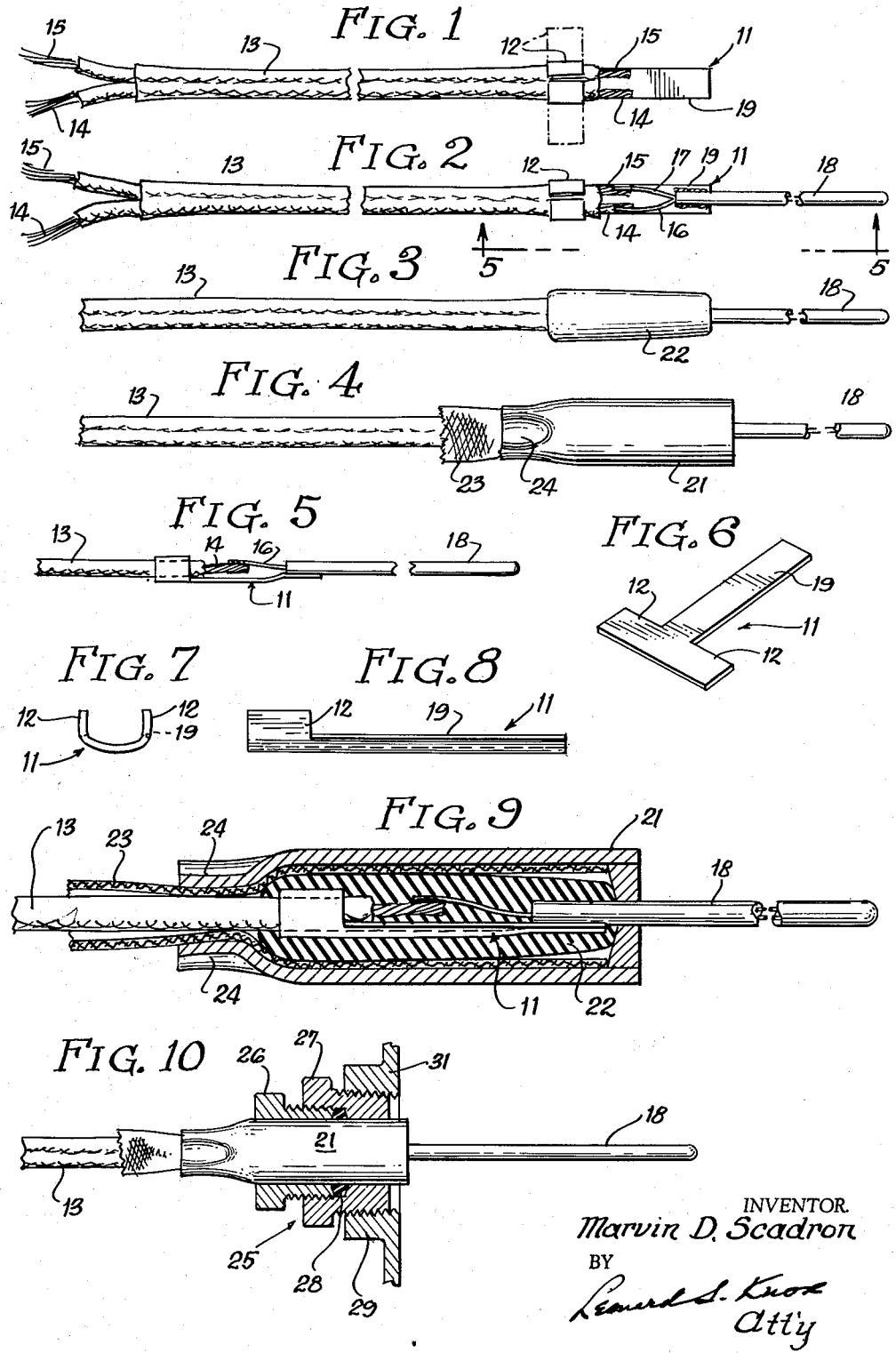

This invention relates to splicing means for providing a connection between comparatively frangible wires enclosed in a rigid sheath and heavier leads connected thereto.

The principal object of the invention is to provide splicing means for the purpose stated which includes a rigid member affixed to the rigid sheath and arranged to bridge the respective connections between the wires to relieve stress thereon.

A further object of the invention is to provide a bridging member functioning in the stated manner further rigidified by a mass of potting compound enclosing the bridging member and splice.

Another object of the invention is to provide a strain relief coupling to preserve the connection between the individual wires of a lead conductor and the respective wires of a thermocouple of the type which includes comparatively fine wires enclosed in a rigid, metallic sheath.

An additional object lies in providing a bridging member, supplementary support in the form of potting compound and a rigid tube surrounding the compound whereby the splice as an entirety way of clamped in suitable ultimate supporting means.

Specifically, the present invention resides in relieving the strain on the junction of lead wires connected to the stubs of fine wire protruding from one end of a metallic-sheathed thermocouple. Thus, according to the present invention, there is provided splicing means comprising a rigid member having one end affixed to the thermocouple sheath and the other to the outer covering of the conductor, this member bridging the joints between the thermocouple wires and the respective leads of the conductor by means of which the thermocouple is connected to an indicating instrument or other means utilizing the output of the thermocouple. The bridging member is desirably encased in potting compound over which an optional covering of insulating sleeving is fitted. Then a metallic tube is placed thereover and locked in place on the outer covering of the conductor with crimping pliers.

A more comprehensive understanding of the present invention may be obtained from the following description when taken in conjunction with the accompanying drawings, wherein:

FIGS. 1 to 4 are views illustrating various steps in the fabrication of the splicing means according to the present invention;

FIG. 5 is a view taken on the line 5—5 of FIG. 2 showing the bridging member assembled to the lead conductor and thermocouple sheath;

FIG. 6 is a developed view in perspective of the bridging member;

FIGS. 7 and 8 are end and side views, respectively, of the bridging member prior to its assembly with the lead conductor and thermocouple sheath.

FIG. 9 is a combined elevational and cross-sectional view of the junction according to the present invention;

FIG. 10 is a view, partly in section, showing an assembly according to the present invention mounted on the wall of a chamber or duct.

Having reference to the drawings, particularly to FIG. 6, the bridging members 11, before being finally assembled, is formed from a T-shaped, thin, flat blank of rigid yet deformable material, e.g. sheet iron or brass, whereafter the arms 12 of which are bent upwardly to substantial parallelism, as shown in FIGS. 7 and 8. As indicated in FIGS. 1 and 2, the arms 12 are bent around into a C-shape to securely clamp and embrace the insulation or braided sleeve of a lead conductor 13, the wires 14 and 15 of which are stripped preparatory to being joined, as by spot welding or soldering, to the exposed stubs 16 and 17 of the wires constituting the active element of a thermocouple assembly 18 which includes a protective metallic sheath. The wires 16 and 17, it will be understood, are generally of extremely fine gauge and only mildly ductile. In some cases it may be desirable to interpose an additional insulating sleeve between the conductor 13 and the member 11 in order to assure that the arms 12, when bent, will not cut through the normal insulation.

As illustrated in FIGS. 2 and 5, the stem 19 of the bridging member 11 is spot welded or otherwise anchored to the metallic sheath of the thermocouple 18. Thus, the member 11 forms a reliable reinforcement locating the lead conductor in alignment with the thermocouple 18, and functioning to absorb lateral and axial stresses which might otherwise result in rupture of the connections between the lead wires and thermocouple wires.

To preclude the possibility of the electrically live elements of the splice shorting out or grounding the parts heretofore described as entering into the splice are covered with a suitable potting compound, e.g. an epoxy resin 22 (FIG. 3), using any suitable temporary mold or the outer rigid sleeve to be described. In some cases the potting compound may suffice to insulate and further rigidify the prior assembly. However, if additional rigidity and protection or a more accurate, metallic surface is desired, as when mounting the thermocouple on the wall of a chamber or duct, an outer, rigid, metallic tube 21 is located over the potting compound and crimped to the insulation of the conductor 13. Preparatory to sliding the tube 21 over the junction, insulating sleeving 23 is slipped over the potting compound 22, (FIG. 9). Such sleeve is slightly longer than the tube in order that a small portion thereof will protrude at one end. Thereafter, while holding the tube 21 properly positioned, the same is crimped as at 24 with a pliers, thereby locking the tube 21 securely in place, as shown in FIGS. 4 and 9, to enclose the junction. The excess of sleeving 23 insures that the crimping operation will not damage the conductor 13.

FIG. 10 shows one manner of mounting the thermocouple assembly in position, for example, in connection with a heat chamber or duct 31 confining the fluid or gas whose temperature is being sensed by the thermocouple. The sleeve 21 is located within the bore of a compression fitting 25 comprising a nut 26 threaded into a plug 27. A suitable compression ring 28 is provided between the nut 26 and plug 27. Plug 27 is shown threaded into a mounting boss 29 on the wall 31.

While the present invention is described with reference to a particular embodiment it is, of course, understood that the invention is capable of embodiment in varied forms without departure from the spirit and scope of the appended claims.

I claim:

1. Means providing a splint-type reinforcement between a conductor comprising a first wire and electrical insulation therearound having a bare end joined to a second wire, said second wire being contained in an elongated rigid, metallic sheath except for a portion thereof exposed at one end of the sheath, said sheath and wires having a common axis comprising: a rigid one-piece strain-relieving member having an elongated first portion extending parallel to the axis bridging the joint between said wires to relieve strain thereon, and a pair of curled arms extending laterally from said first portion, said arms embracing said insulation in clamping engagement therewith, said first portion being integrated with said sheath, a mass of potting compound surrounding the member, an adjacent part of the insulation and the adjacent part of the sheath, and a rigid tube surrounding the mass of potting compound.

2. Means providing a splint-type reinforcement between a conductor comprising a first wire and electrical insulation therearound having a bare end joined to a second wire, said second wire being contained in an elongated rigid, metallic sheath except for a portion thereof exposed at one end of the sheath, said sheath and wires having a common axis comprising: a rigid one-piece strain-relieving member having an elongated first portion extending parallel to the axis bridging the joint between said wires to relieve strain thereon, and a pair of curled arms extending laterally from said first portion, said arms embracing said insulation in clamping engagement therewith, said first portion being integrated with said sheath, a mass of potting compound surrounding the member, an adjacent part of the insulation and the adjacent part of the sheath, a rigid tube surrounding the mass of potting compound, and said tube being in crimped relation with the insulation.

3. Means providing a splint-type reinforcement between a conductor comprising a first wire and electrical insulation therearound having a bare end joined to a second wire, said second wire being contained in an elongated rigid, metallic sheath except for a portion thereof, exposed at one end of the sheath, said sheath and wires having a common axis comprising: a rigid one-piece strain-relieving member having an elongated first portion extending parallel to the axis bridging the joint between said wires to relieve strain thereon, and a pair of curled arms extending laterally from said first portion, said arms embracing said insulation in clamping engagement therewith, said first portion being integrated with said sheath, a mass of potting compound surrrounding the member, an adjacent part of the insulation and the adjacent part of the sheath, a rigid tube surrounding the mass of potting compound, said tube being in crimped relation with the insulation, and a sleeve of insulating material intermediate said tube and insulation.

References Cited in the file of this patent

UNITED STATES PATENTS

| | | |
|---|---|---|
| 2,508,512 | Grinde | May 23, 1950 |
| 2,774,948 | Wendel | Dec. 18, 1956 |
| 2,911,616 | Townsend | Nov. 3, 1959 |
| 3,009,129 | Kirk | Nov. 14, 1961 |